Nov. 24, 1942.  W. S. SARGENT  2,302,973
MACHINE FOR SHREDDING CORN STALKS AND ROOT CROWNS
Filed Feb. 5, 1940  2 Sheets-Sheet 1
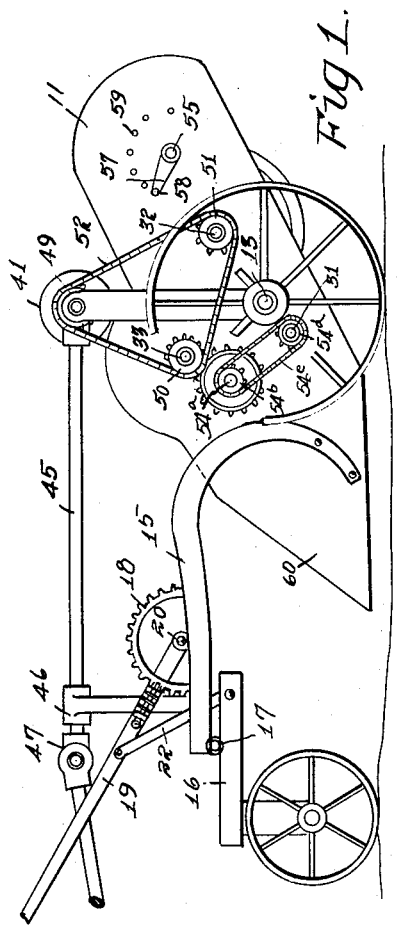
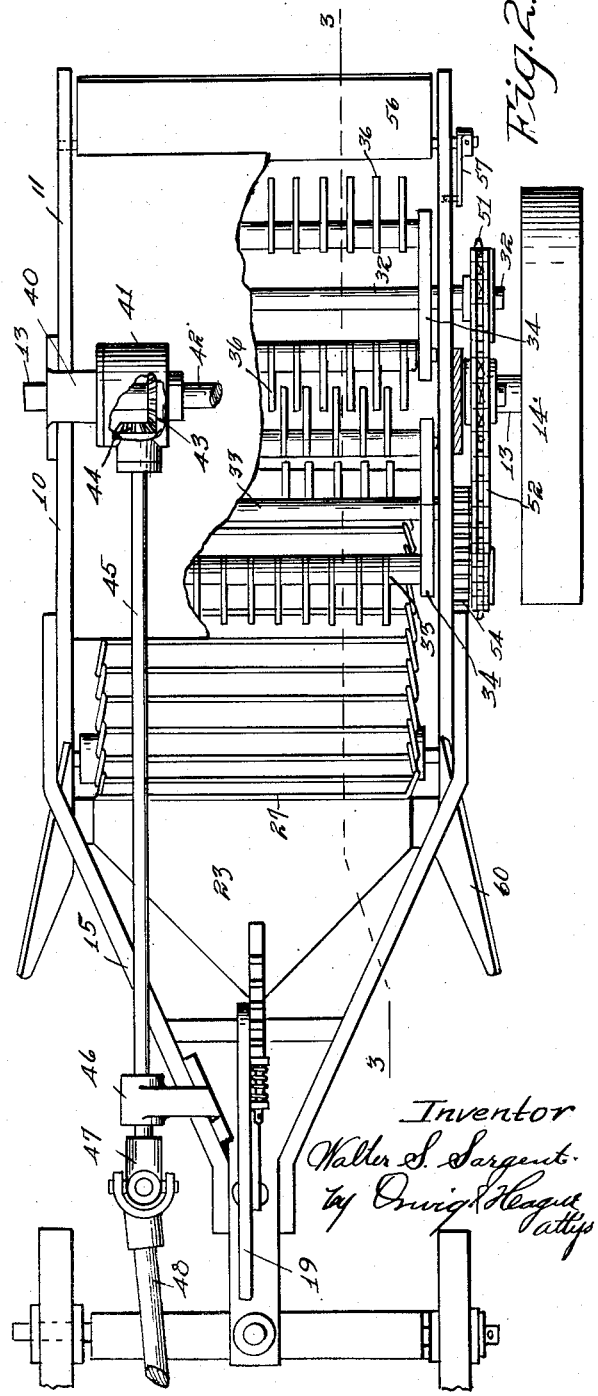
Inventor
Walter S. Sargent.

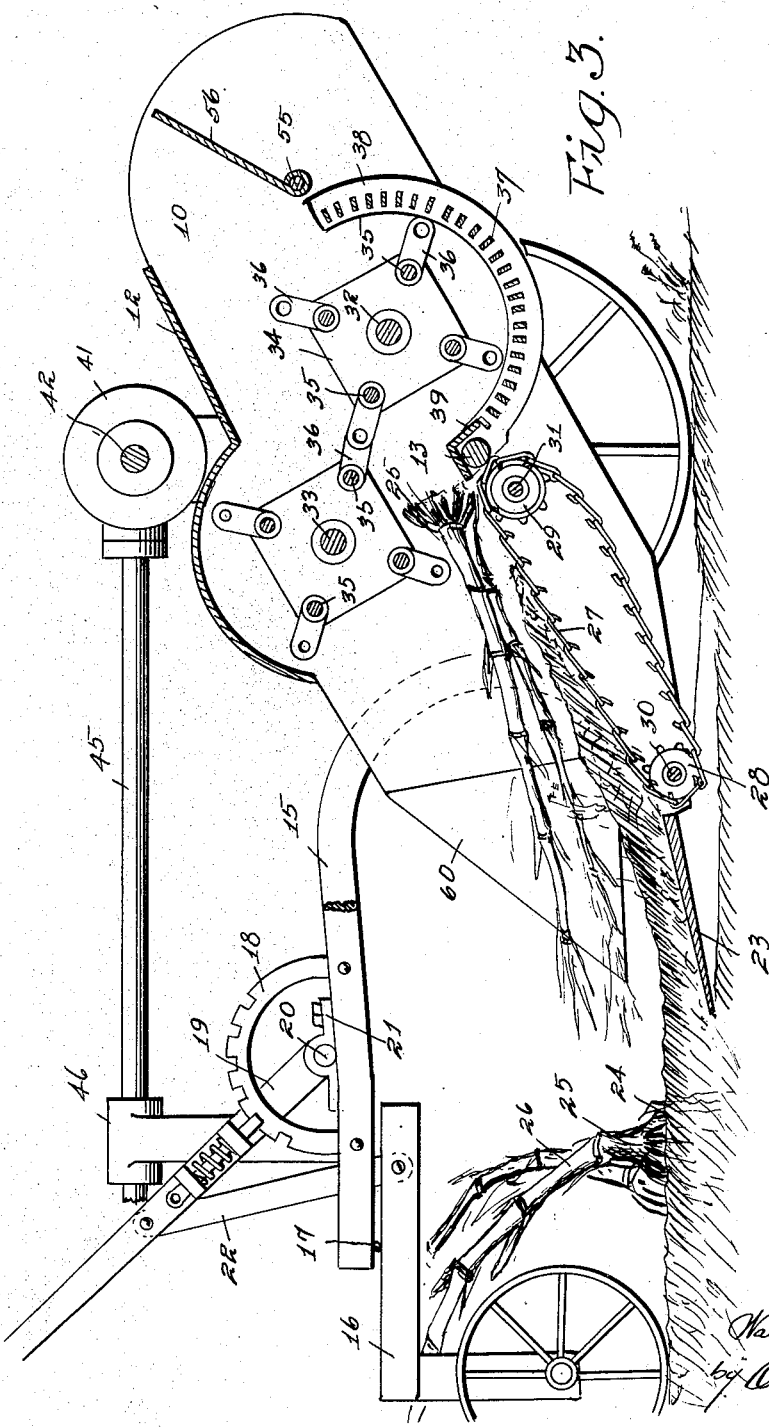

Patented Nov. 24, 1942

2,302,973

UNITED STATES PATENT OFFICE 2,302,973

MACHINE FOR SHREDDING CORN STALKS AND ROOT CROWNS

Walter S. Sargent, Des Moines, Iowa

Application February 5, 1940, Serial No. 317,329

4 Claims. (Cl. 55—118)

This invention relates to improvements in devices for breaking up and reducing cornstalks and the like to small particles or shreds, wherein the same may be plowed under and worked into the soil to serve as a mulch, and also to break up the stalks into small pieces so that the soil may be more easily tilled and cultivated after crops have been planted therein.

This invention relates more particularly to means whereby the root crowns of the stalks may be loosened and elevated from the soil and broken up in such a manner that they will not hinder in the cultivation of the soil.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved device;

Figure 2 is a plan view of the same with a portion of the cover broken away;

Figure 3 is a longitudinal sectional view taken on the line 3—3 of Figure 2.

My improved device comprises a supporting frame 10, having side members 11 and a top portion 12, said frame being carried by an axle 13 supported by means of wheels 14, the forward end of the frame 10 being fixed to a bifurcated beam 15 having its forward end pivotally connected to the upper end of a tongue truck 16 by means of a hinge device 17.

Supported on the beam 15 is a lever sector 18 designed to co-operate with a lever 19 carried on a shaft 20, which in turn is mounted in bearing members 21 carried by the beam 15. A link 22 provides means for operatively connecting the lever 19 with the rear end of the tongue truck 16 in the manner clearly illustrated in Figure 3 wherein the forward end of the frame 10 may be elevated and lowered.

Carried by the forward end of the frame 10 is a cutter or shovel 23 the forward edge of which is designed to enter the ground a slight distance from the surface in such a manner that as the machine is advanced, the cutting edge of the shovel will engage the roots 24 of the root crown 25 of the corn stalks 26, and cause them to be severed from the ground. The ground thus gathered by the shovel, and the severed crowns, are then delivered to a ladder conveyor 27 carried on sprockets 28 and 29, the sprockets 28 being carried by a shaft 30 supported in the forward end of the frame 10, the sprockets 29 being carried by a shaft 31 supported in said frame 10 and immediately in front of and below the axle 13.

Also mounted in the frame 10 is a shaft 32 behind the shaft 13 and substantially in alinement with the upper run of the conveyor 27. A shaft 33 is also mounted in said frame above and slightly forward of the shaft 13. Each of the shafts 32 and 33 is provided with square plates 34 near their ends and inside of the frame members 10, and each corner of each corresponding set of plates 34 is provided with a shaft 35 on which is mounted a series of pivoted hammers 36. The shafts 32 and 33 are spaced apart such a distance that the hammers 36 carried by the shaft 32 will overlap the hammers carried by the shaft 33, the hammers of the shaft 32 being staggered with respect to the hammers carried by the shaft 33, as clearly illustrated in Figure 2, both of the shafts 32 and 33 being rotated in a counter-clockwise direction, as illustrated in Figure 3.

Mounted concentrically with and below the shaft 32 is a series of transversely arranged bars 37 to form a screen, and arranged a slight distance from the outer ends of the hammers 36, the said bars 37 being arranged in substantially semi-circular frame members 38. An angle iron 39 is mounted above and back of the shaft 13 to shield the shaft and at the same time provide means for tying the side members of the frame in fixed relation with each other, the shaft 33 being mounted above the member 13 a sufficient distance to permit the crowns of the corn stalks to pass above the member 13 and below the shafts 35 carried by the plates 34 of the shaft 33.

For rotating the shafts 31, 32 and 33 I have provided on the frame members 10 a bracket 40 adapted to carry a gear housing 41 having a shaft 42 arranged transversely above the frame members 10. A bevel-gear 43 is fixed to and carried by the shaft 42, adapted to mesh with a pinion 44 carried by the rear end of the power take-off shaft 45. The forward end of the shaft 45 is mounted in a bearing 46 carried by one of the beam members 15, the forward end of the shaft being provided with an ordinary universal joint 47 having a shaft 48 adapted to make connection with the power take-off shaft of a farm tractor in the usual manner, thus providing means for rotating the shafts 42 and 45. One end of the shaft 42 is provided with a sprocket wheel 49, while the corresponding ends of the shafts 32 and 33 are provided with sprockets 50 and 51. A chain 52 is mounted on said sprockets 49, 50 and 51, thus providing means for rotating the shafts 32 and 33. The shaft 33 is provided with a pinion gear 53 designed to mesh with a spur gear 54 mounted on a stub shaft 54a, the shaft 54a being provided with a sprocket 54b supporting a chain 54c adapted to travel over a sprocket 54d carried by the shaft 31, thus providing means whereby the conveyor 27 may be rotated in a clockwise direction by means of the pinion 53 and the gear 54, causing the conveyor 27 to be rotated in a clockwise direction, and the stalk crowns, together with the stalks, to be elevated and delivered to the hammers 36. Most of the dirt delivered from the cutter will be sifted through the ladder conveyor, and nothing but large clods and the stalks will be delivered to the hammers. As the hammers are rotated the said root crowns, together with the dirt accumulated thereon, will be engaged by the hammers and the dirt will be loosened from the roots and the root crowns crushed and broken up. The said crowns will be delivered to the grate formed by the bars 37, permitting the broken stalks and root crowns to be delivered through and between the bars to the ground surface in a finely divided condition.

I have found that a rotation of the hammers will oftentimes cause a draft to be created which tends to deliver stalks forwardly over the tops of the rotating hammer heads. To overcome this difficulty I have mounted in the frame members 10 a transversely arranged shaft 55 carrying a plate or damper 56, one of the outwardly extending ends of the shaft 55 being provided with a lever 57 having a pin 58 designed to co-operate with openings or notches 59 in the sides of one of the frame members 10 in such a manner that the angle of the damper 56 may be adjusted so as to prevent movement of air in an anticlockwise direction around the hammers, and prevent the air from being delivered forwardly from the rear set of hammers to the forward set of hammers. This damper 56 also provides means for preventing stalks and broken-up material from being delivered forwardly into the cutters by the influence of a tail wind.

The forward end of the frame is also provided with gathering boards 60 which assist in separating the down stalks of the row of stalks being operated upon, from an adjacent row of stalks.

Thus it will be seen I have provided a simple and comparatively cheap device so constructed and arranged that as the machine is advanced the cutting edge of the cutter 23 may be adjusted by means of the lever 19, to such a depth that the major portion of the root crowns will be severed from the ground, and at the same time shallow enough so that only a thin layer of dirt will necessarily be delivered to the ladder conveyor, the severed root crowns and the stalks then being broken up and shredded by means of the rapidly rotating hammer elements, and the shredded and broken portions of the stalks being delivered to the ground surface, which may then be worked into the ground as the ground is plowed, to form a mulch. The root crowns will also be broken up so that they will not be engaged by planter runners or cultivator shovels or by other surface-elevating devices as the ground is tilled, thus eliminating a considerable amount of loss of small growing plants that would result from these large stubs being dragged through the ground when plowed under without first being broken up. By breaking the stalks into small particles and shreds the stalks are utilized for mulching the soil in a manner not possible when the stalks are cut in short sections as heretofore has been the common practice.

I claim as my invention:

1. In a device of the class described, a portable frame, a root loosening element carried thereby, a ladder chain located to convey material from said root loosening device to a point upwardly and rearwardly therefrom, a transversely arranged shaft above the delivery end of said conveyor, a second shaft carried by said frame back of said conveyor, a hammer head carried by each of said shafts, a series of pivoted hammers carried by each of said heads, the hammers of one head being in staggered relation to those of the other, a screen located concentrically below the path of travel of the hammers carried by the said second head, means for causing said ladder chain to be operated, said means rotating said shafts in the same direction with the forward side of said heads moving downwardly, whereby corn stalks and the like loosened by said root loosener will be conveyed upwardly from said conveyor with the greater portion of the dirt carried thereby rattled through the ladder conveyor and whereby the butts of said stalks and the dirt carried thereby will first be engaged by the hammers of the first set of hammers to loosen the dirt therefrom and to partially disintegrate the roots, and whereby comparatively clean roots and stalks will be delivered to the second hammers and to said screen.

2. In a device of the class described, a portable frame, a root loosening element carried thereby, a ladder chain located to convey material from said root loosening device to a point upwardly and rearwardly therefrom, a transversely arranged shaft above the delivery end of said conveyor, a second shaft carried by said frame back of said conveyor, a hammer head carried by each of said shafts, a series of pivoted hammers carried by each of said heads, the hammers of one head being in staggered relation to those of the other, a screen located concentrically below the path of travel of the hammers carried by the said second head, means for causing said ladder chain to be operated, said means rotating said shafts in the same direction with the forward side of said heads moving downwardly, whereby corn stalks and the like loosened by said root loosener will be conveyed upwardly from said conveyor with the greater portion of the dirt carried thereby rattled through the ladder conveyor and whereby the butts of said stalks and the dirt carried thereby will first be engaged by the hammers of the first set of hammers to loosen the dirt therefrom and to partially disintegrate the roots, and whereby comparatively clean roots and stalks will be delivered to the second hammers and to said screen, and an adjustable shield carried by the rear end of said frame and above the second head to prevent currents of air from delivering material from the under side of said screen back into position to travel between said first and second set of hammers.

3. In a device of the class described, a portable frame, a root-loosening device carried thereby, a conveyor for elevating material from said root-loosening device to a point upwardly and rearwardly therefrom, a transversely arranged shaft above the delivery end of said conveyor, a second shaft carried by said frame back of said conveyor, a hammer head carried by each of said shafts, a series of pivoted hammers carried by each of said heads, a screen located below the path of travel of the hammers carried by said second head, means for causing said conveyor to be operated, means rotating said shafts in the same direction with the forward side of said heads moving downwardly whereby corn talks and the like loosened by said root loosener will be carried on said conveyor and delivered to the first one of said heads, whereby the butts of said stalks and the dirt carried thereby will first be engaged by the first set of hammers to loosen the dirt thereon and to partially disintegrate the roots, and whereby comparatively clean roots and stalks will be delivered to the second hammers and to said screen.

4. In a device of the class described, a portable frame, a root-loosening element carried thereby, a rotatably mounted hammer head carried by said frame, a second rotatably mounted hammer head mounted to receive material from the first hammer head, said hammer heads including pivoted hammers, a screen below the second hammer head, means for receiving material from said root-loosening element and delivering the same to the first hammer head, means for operating said conveyor and said heads as the device is advanced, whereby the butts of said stalks and the dirt carried thereby will first be engaged by the first set of hammers to loosen the dirt therefrom and to partially disintegrate the roots and whereby comparatively clean roots and stalks will be delivered to the second hammers and to said screen.

WALTER S. SARGENT.